(12) United States Patent
Püttmann

(10) Patent No.: US 8,967,911 B2
(45) Date of Patent: Mar. 3, 2015

(54) BORING SYSTEM

(75) Inventor: Franz-Josef Püttmann, Lennestadt (DE)

(73) Assignee: Tracto-Technik GmbH & Co. KG, Lennestadt (DE)

( * ) Notice: Subject to any disclaimer, the term of this patent is extended or adjusted under 35 U.S.C. 154(b) by 813 days.

(21) Appl. No.: 12/594,681

(22) PCT Filed: Apr. 3, 2008

(86) PCT No.: PCT/EP2008/002655
§ 371 (c)(1),
(2), (4) Date: Aug. 2, 2010

(87) PCT Pub. No.: WO2008/122403
PCT Pub. Date: Oct. 16, 2008

(65) Prior Publication Data
US 2010/0282517 A1    Nov. 11, 2010

(30) Foreign Application Priority Data

Apr. 5, 2007   (DE) .......................... 10 2007 016 823

(51) Int. Cl.
| E02F 5/10 | (2006.01) |
| F16L 55/165 | (2006.01) |
| E21B 7/04 | (2006.01) |
| E21B 7/30 | (2006.01) |
| E21B 17/046 | (2006.01) |

(52) U.S. Cl.
CPC ............ *F16L 55/1658* (2013.01); *E21B 7/046* (2013.01); *E21B 7/30* (2013.01); *E21B 17/046* (2013.01)
USPC .......................................................... 405/184

(58) Field of Classification Search
USPC .................... 405/154.1, 184, 184.1, 184.3
See application file for complete search history.

(56) References Cited

U.S. PATENT DOCUMENTS

| 1,660,999 | A | * | 2/1928 | MacDonell ..................... 175/79 |
| 2,726,847 | A | * | 12/1955 | McCune et al. ................ 175/61 |
| 3,011,568 | A | * | 12/1961 | Grimm .......................... 175/74 |
| 4,007,797 | A | * | 2/1977 | Jeter ............................ 175/26 |
| 4,388,020 | A | * | 6/1983 | Uemura et al. ............... 405/138 |
| 4,898,498 | A | * | 2/1990 | Akesaka ....................... 405/184 |
| 4,936,708 | A | * | 6/1990 | Perry ........................... 405/184 |
| 4,964,474 | A | * | 10/1990 | Poesch ......................... 175/74 |
| 5,085,283 | A | * | 2/1992 | Seabourn et al. .............. 175/61 |
| 5,439,066 | A | * | 8/1995 | Gipson ........................ 175/61 |
| 5,904,444 | A | * | 5/1999 | Kabeuchi et al. ............ 405/184 |
| 5,960,892 | A | * | 10/1999 | Balve et al. ................... 173/91 |
| 5,980,157 | A | * | 11/1999 | Puttman ....................... 405/184 |
| 6,003,606 | A | * | 12/1999 | Moore et al. .................. 166/381 |
| 6,173,787 | B1 | * | 1/2001 | Wittrisch ...................... 166/384 |
| 6,179,058 | B1 | * | 1/2001 | Wittrisch ...................... 166/384 |

(Continued)

FOREIGN PATENT DOCUMENTS

| DE | 33 22 427 C2 | 1/1985 |
| DE | 196 08 980 C2 | 5/1998 |

(Continued)

*Primary Examiner* — John Kreck
*Assistant Examiner* — Patrick Lambe
(74) *Attorney, Agent, or Firm* — Howard IP Law Group, PC

(57) ABSTRACT

The invention relates to a system for the overground operation of underground sewer tools, especially of expander and pulling heads comprising a rod assembly that is rigid when pushed and a supporting device absorbing shear or tractive forces.

10 Claims, 4 Drawing Sheets

(56) References Cited

U.S. PATENT DOCUMENTS

| | | | |
|---|---|---|---|
| 6,220,372 B1* | 4/2001 | Cherry | 175/81 |
| 6,238,141 B1* | 5/2001 | Puttmann et al. | 405/184 |
| 6,273,189 B1* | 8/2001 | Gissler et al. | 166/241.1 |
| 6,364,036 B1* | 4/2002 | Puttmann | 175/52 |
| 6,364,038 B1* | 4/2002 | Driver | 175/95 |
| 6,550,553 B2* | 4/2003 | Baird | 175/75 |
| 6,588,983 B1* | 7/2003 | Tenbusch, II | 405/184.3 |
| 6,920,945 B1* | 7/2005 | Belew et al. | 175/67 |
| 6,953,306 B2* | 10/2005 | McGillis | 405/184 |
| 7,052,049 B2* | 5/2006 | Puttmann | 285/147.1 |
| RE40,067 E* | 2/2008 | Gondouin | 166/380 |
| 7,686,101 B2* | 3/2010 | Belew et al. | 175/62 |
| 7,690,443 B2* | 4/2010 | Brunet et al. | 175/61 |
| 2003/0059260 A1* | 3/2003 | Putnam | 405/184.3 |
| 2003/0147700 A1* | 8/2003 | Carter et al. | 405/184 |
| 2006/0002765 A1* | 1/2006 | Hutton et al. | 405/184.1 |
| 2006/0034666 A1* | 2/2006 | Wentworth et al. | 405/184 |
| 2006/0093436 A1* | 5/2006 | Gearhart | 405/184.2 |
| 2006/0110219 A1* | 5/2006 | Puttmann | 405/183.5 |
| 2006/0165490 A1* | 7/2006 | Cazes | 405/184 |
| 2006/0193697 A1* | 8/2006 | Wentworth et al. | 405/184 |
| 2007/0264085 A1* | 11/2007 | Kanao | 405/184.1 |
| 2009/0175689 A1* | 7/2009 | Tjader | 405/184.3 |
| 2009/0255701 A1* | 10/2009 | Puttmann et al. | 173/171 |
| 2010/0150643 A1* | 6/2010 | Puttmann | 403/2 |
| 2010/0196089 A1* | 8/2010 | Puttmann | 403/294 |

FOREIGN PATENT DOCUMENTS

| | | |
|---|---|---|
| DE | 199 18 530 A1 | 10/2000 |
| DE | 199 34 241 A1 | 2/2001 |
| DE | 100 65 533 A1 | 7/2002 |
| DE | 102004032356 A1 | 2/2006 |
| JP | 10-018772 | 1/1998 |
| JP | 2005-69390 A | 3/2005 |

* cited by examiner

BORING SYSTEM

CROSS-REFERENCES TO RELATED APPLICATIONS

This application is the U.S. National Stage of International Application No. PCT/EP2008/002655, filed Apr. 3, 2008, which designated the United States and has been published as International Publication No. WO 2008/122403 and which claims the priority of German Patent Application, Serial No. 10 2007 016 823.5, filed Apr. 5, 2007, pursuant to 35 U.S.C. 119(a)-(d).

BACKGROUND OF THE INVENTION

The invention relates to a system for operating pipeline tools, in particular expansion and pull heads with a rod assembly that is rigid when pushed. These pipeline tools are known to be used for rehabilitating pipelines, exchanging pipes, or constructing new pipelines.

When pipeline pipes are horizontally exchanged, pipeline tools such as expansion and pull heads are moved through the pipeline, whereby old pipes are broken up and pushed aside or pulled out of the pipeline. At the same time, new pipes can be inserted into the pipeline. Various systems are known to move the tools with the forces required for this purpose. For example, pull ropes pull the tools through the pipeline with the assistance of hoist gear. To avoid installation of such hoist gear in the pipeline axis, the hoist gear can be operated above ground by redirecting the pull rope out of the pipeline axis via a pulley. However, hoist gear is expensive and restricted to application of pull forces.

Higher forces can be applied via hydraulic linear drives. These too can be driven by a rope; however, they are then also restricted to pull forces.

To apply push forces and higher pull forces, linear drives, which are operated by rod assemblies that are rigid when pushed, are described in, for example, DE 196 08 980 C2. For this purpose, the linear drive is arranged in a hopper or pit in the pipeline axis.

In operation, the individual rod assembly sections must be strung together or connected to each other. Consequently, for longer bores, the rod assembly includes numerous rod assembly sections which must be, in accordance with the progress of the boring, connected to or separated from each other, one at a time. An individual section is of limited length and must be very short particularly when the boring takes place in a short building pit, for example an inspection chamber. These can have diameters of, in part, less than one meter. This means that connecting the rod segments is considerably cumbersome, in particular in the case of long bore lengths. The presence of human beings in the vicinity of the drive for connecting the rod segments is particularly undesirable if it must take place in a narrow and often-times a foul-smelling inspection chamber, as is frequently the case when rehabilitating pipelines.

The prior art discloses efforts to simplify connection of the rod segments by providing, for example, couplings instead of screw connections.

Such a rod assembly is known from DE 199 18 530 A1. In order to facilitate a highly tensile or rotationally fixed connection between two rod assembly sections, these couplings have an axially protruding lug-like attachment piece at the front end of the rod assembly section to be coupled. This attachment piece glidingly engages the back end of preceding rod assembly section.

As an alternative solution approach, DE 196 08 980 describes a sprocket chain by means of which push and pull forces can be applied to a pipeline tool so that it is unnecessary to connect rod assembly sections in the pit, while pull forces can still be applied. However, such a chain is expensive, fragile, and difficult to transport.

Newer developments have resulted in rod assemblies that further simplify connecting the rod assembly sections and that even allow for connecting the rod assembly sections on the earth's surface. Thus, an extended presence in the pit is unnecessary. DE 100 65 533 A1 describes a coupling by means of which rod assembly sections are plugged together through connecting corresponding ends of the rod assembly sections. This is accomplished by shifting the rod assembly section axes in parallel fashion. Thereby, a first rod assembly section has a journal which engages a corresponding recess of a second rod assembly section. In this way, the rod assembly section can already be connected on the earth's surface so that, once the linear drive has been installed in the pit and the rod assembly has been assembled, operation can be performed from the earth's surface for a certain time period.

SUMMARY OF THE INVENTION

It is an object of the invention to provide a system for horizontal boring and/or rehabilitating pipes which allows for operating rod assemblies from the earth's surface.

This object is achieved in accordance with one aspect of the invention by a method for inserting forces into an underground pipeline axis by means of a rod assembly, wherein the forces are inserted into a pit via a rod assembly, which can negotiate curves, outside of the pipeline axis and wherein the forces are redirected into the pipeline axis (8) via a guide.

According to another aspect of the invention, this object is achieved by a system for operating pipeline tools, in particular expansion and pull heads with a hinge-coupled individual rod section that is rigid when pushed, wherein there is provided a force-absorbing guide for redirecting push or pull forces.

According to still another aspect of the invention, this object is achieved by a rod segment for operating pipeline tools, in particular expansion and pull heads, wherein the rod segment has a circular arc segment section.

According to yet another aspect of the invention, this object is achieved by a rod assembly having individual rod segments for operating pipeline tools, in particular expansion and pull heads, wherein there is provided a guide section that allows for redirecting the push or pull forces.

The invention is based on the idea of providing a system for operating pipeline tools, in particular, expansion and pull heads, with a rod assembly that is rigid when pushed and with a device that redirects push and pull forces from the axis of the drive into the axis of the pipeline. This facilitates above-ground operation of a linear drive with a rod assembly that is rigid when pushed.

The system is constructed in such a way that the forces are vertically redirected from the earth's surface into the pipeline axis via a linear drive. This is accomplished by inserting rod assemblies, which are rigid when pushed but which can, due to their coupling, negotiate curves, into the pipeline axis on a curved path via a guide. Thereby, the guide serves as counter bearing for the push and pull force that is applied from the drive to the rod assembly.

The guide can be constructed as a roller track. Preferably, an individual rod segment has at least one section that is adapted to the shape of the guide. For example, the rod assembly section can be configured in the shape of a circle segment.

The radius of the circular arc can correspond to the radius of the roller track so that an optimized force distribution onto the guide is achieved. In accordance with the invention, the guide can be realized on the inner radius and/or outer radius of the cam-track of the rod assembly. In this way, both push and pull forces can be applied from the earth's surface to the tool located in the pipeline axis.

Preferably, the invention is operated with rod assemblies having couplings in accordance with FIGS. 4 and 5.

In addition, a method is provided for inserting forces into an underground pipeline axis, in which the forces are inserted into a pit via a curved rod assembly outside of the pipeline axis, and in which the forces are redirected into the pipeline axis via a guide.

The term "pipeline" within the scope of the present invention means in particular any kind of longitudinally extended space including all bore holes that are to be provided. Such a space is worked on with expansion, boring, or other tools or rehabilitated by pulling out old pipes and/or inserting new pipes.

BRIEF DESCRIPTION OF THE DRAWING

The invention is described in more detail below by means of an embodiment shown in the drawing.

The drawing shows.

DETAILED DESCRIPTION OF PREFERRED EMBODIMENTS

Figure 1:
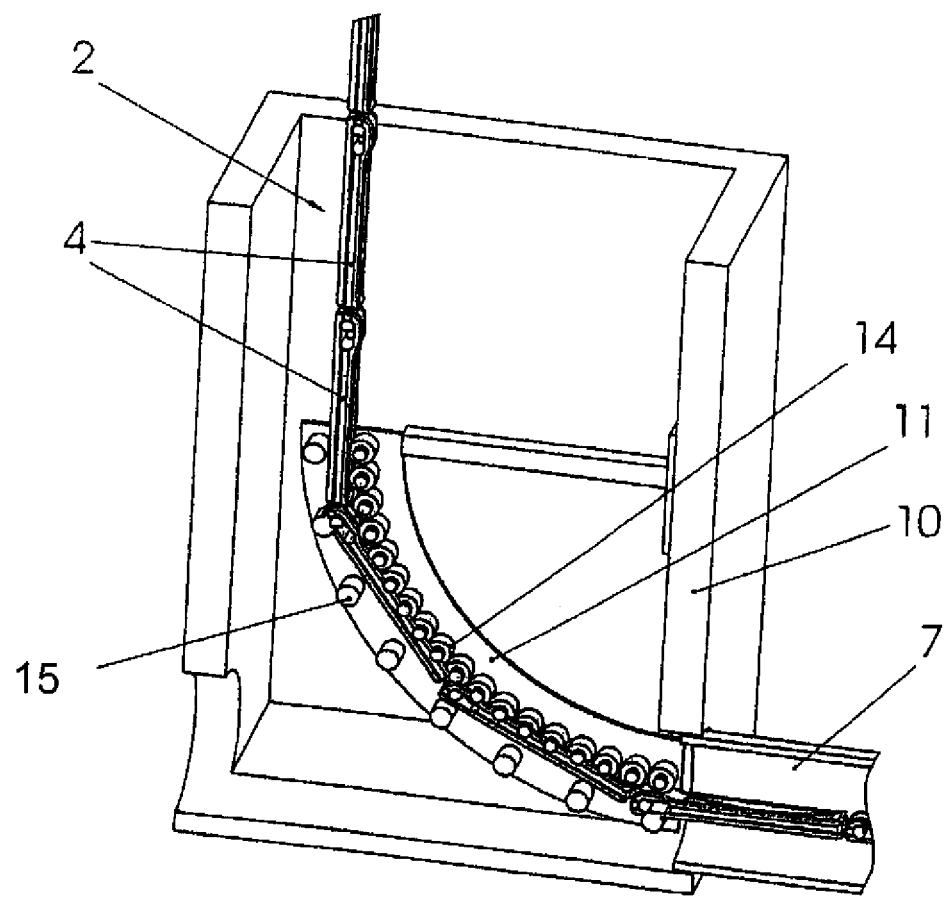
FIG. 1 a sectional view of a pit with roller guide and rod assembly.

The system in accordance with the invention includes a drive 1 and a rod assembly 2 with hinge-coupled rod assembly sections 4 that move a tool 6 in a pipeline 8. The tool 6 is a burst head that pushes an old pipe 7 to the side in the earth. The drive 1 transfers push and pull forces into the pipeline axis 8 via a pit 10.

A guide 11 with inner rolls 14 and outer rolls 15 is arranged in the pit 10. Due to its hinge-like couplings and its shape, the rod assembly 2 touches the outer rolls 15 when a pull force is applied. The outer rolls 16 provide for redirecting the thrust into the pipeline axis 8. When pull forces are applied, the rod assembly 2 touches the inner rolls 14 of the guide 11 and allows for the pull forces to be transferred into the pipeline axis 8 and, thus, onto the tool 6.

Figure 2:
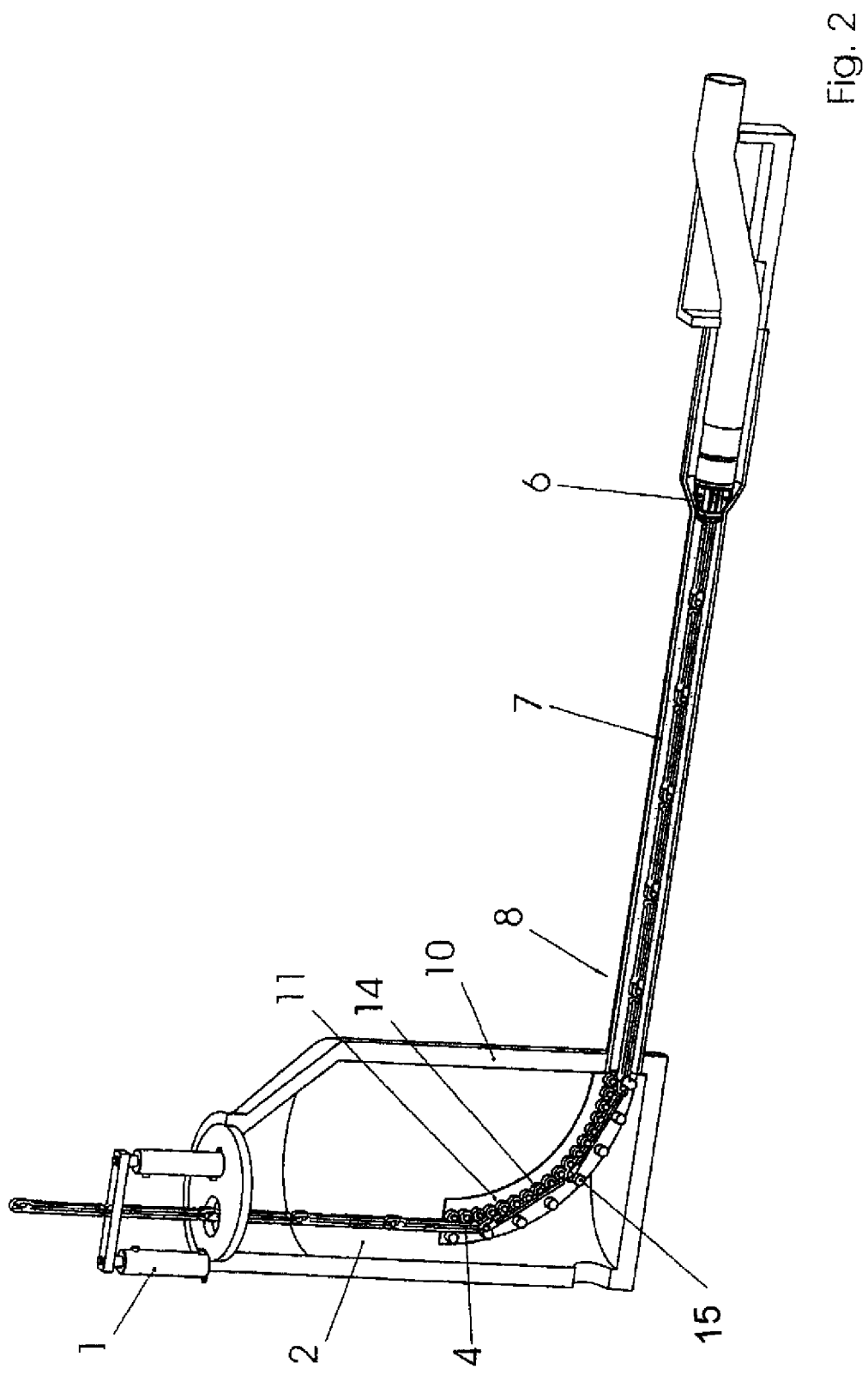
FIG. 2 application of a pulling apparatus above ground for inserting a new pipe.

FIG. 2 shows the use of a push/pull device above the hopper. The rod assembly is redirected by 90° in the hopper and pushed into the old pipe or pulled out of the old pipe.

Figure 3:
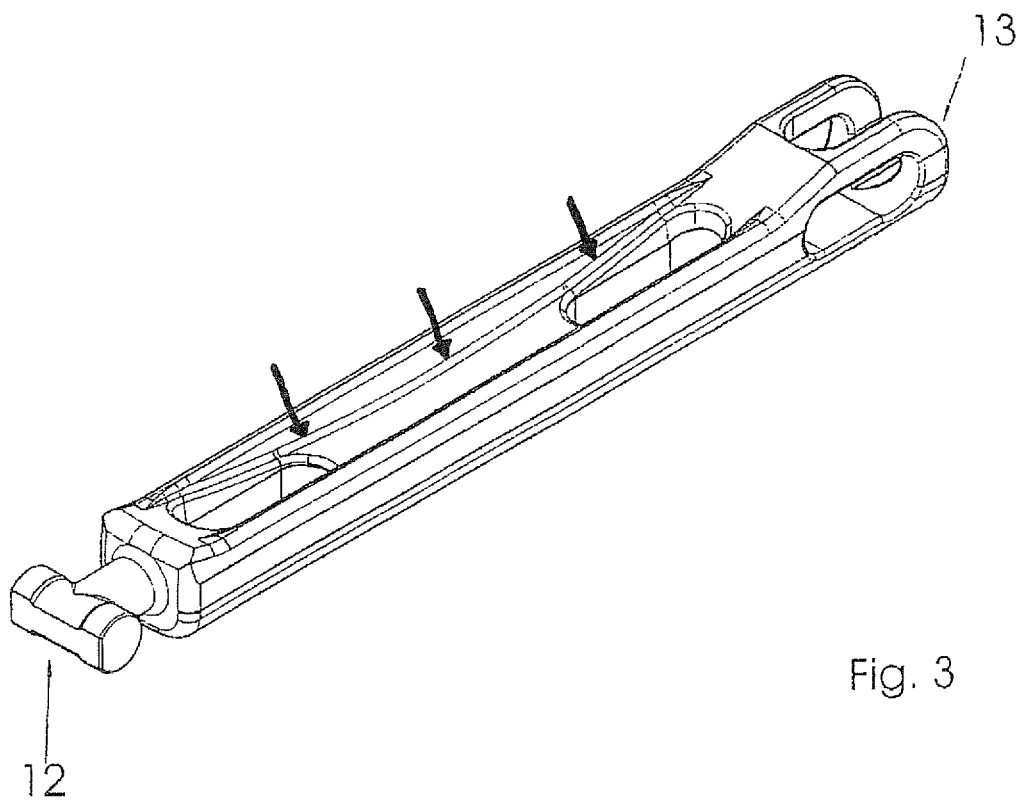
FIG. 3 a rod assembly section in accordance with the invention for operation with a roller track.

The rod assembly sections 4 exhibit a shape between the coupling ends 12, 13 that corresponds to a circular arc segment (see arrow) (FIG. 3). This allows for accomplishing an even support of the pull and push forces in the guide so that no peak loads of the rod assembly sections and guide occur.

Figure 4:
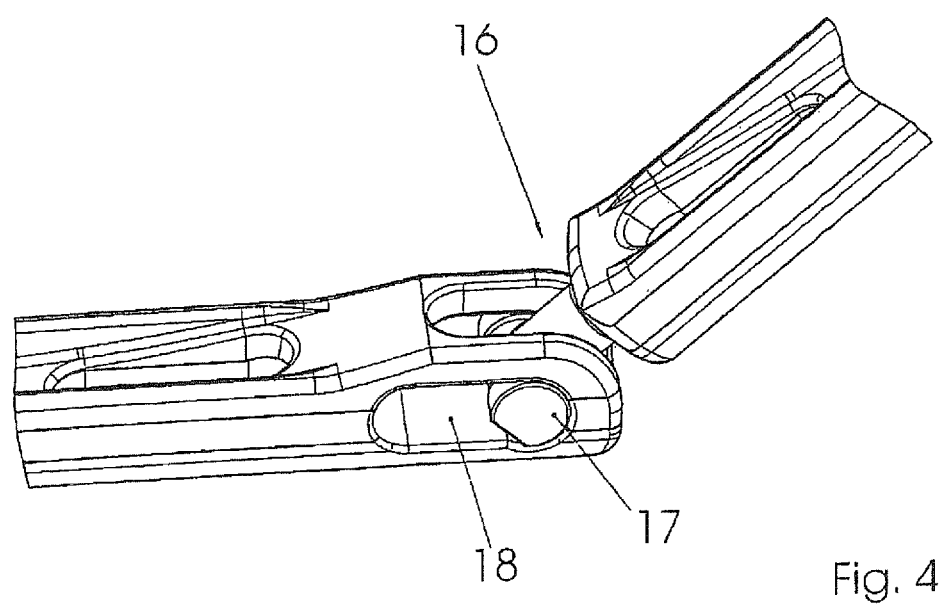
FIG. 4 a coupling for a rod assembly which can negotiate curves.
Figure 5:
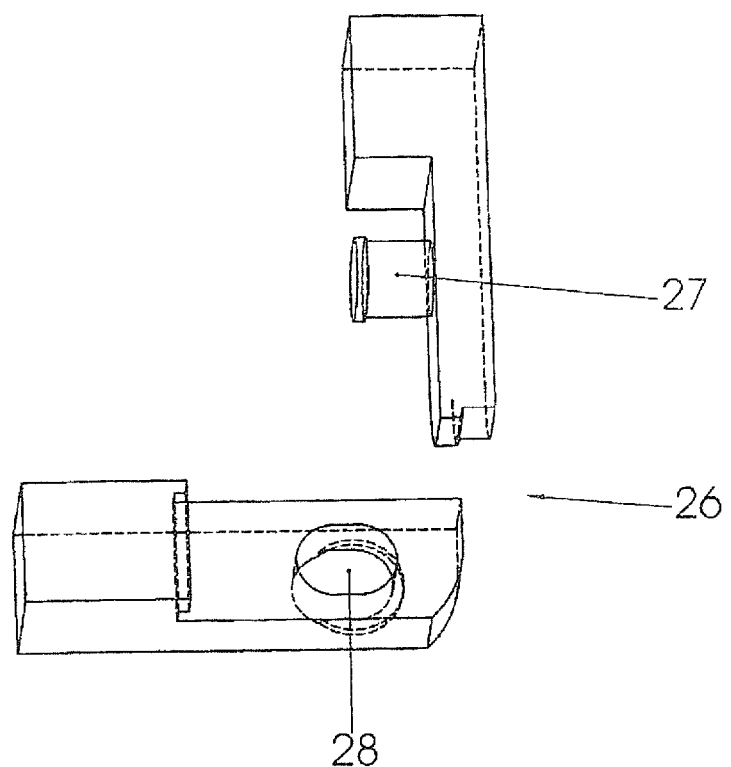
FIG. 5 a further coupling for a rod assembly which can negotiate curves.

FIGS. 4 and 5 show rod assembly couplings 16, 26 that allow for the curviness of the rod assembly so that forces can be redirected from the drive axis into the pipeline axis.

The couplings 16, 26 have a stop ridge 17, 27 which is inserted into a transverse recess 18, 28 and which can there transfer forces over a wide angular range from one rod assembly section to the next.

The rod assembly can take on the shape of a circular arc segment on both sides, i.e., concave/concave or concave/convex in order to match the shape of different support devices or in order to be operated in different curve directions.

What is claimed is:

1. A method for operating a pipeline tool in an underground pipeline, comprising:
    connecting the pipeline tool to a rod assembly, which is able to negotiate curves, the rod assembly having a concave circular arc section;
    inserting push and pull forces into a pit via the rod assembly, from above ground; and
    redirecting the push and pull forces into a pipeline axis by absorbing the push and pull forces with a curved guide positioned in the pit and having inner and outer roller tracks respectively provided along an inner radius and an outer radius of the curved guide, wherein the push forces are redirected by guiding the rod assembly along the outer roller track, and wherein the pull forces are redirected by guiding the concave circular arc section of the rod assembly along the inner roller track,
    wherein the concave circular arc section comprises a track having a curved profile defined about an axis oriented generally transverse to a direction of motion of the rod assembly imparted by the push and pull forces so as to engage at least one of the inner and outer roller tracks.

2. The method according to claim 1, wherein the forces are vertically inserted from the earth's surface into the pit via a linear drive, and wherein the forces are subsequently redirected into the pipeline axis by means of the guide.

3. A system for operating a pipeline tool, comprising:
    a rod assembly connected to the pipeline tool, the rod assembly having hinge-coupled individual rod segments that are rigid when pushed;
    a drive configured to transfer push and pull forces to the rod assembly, said drive being arranged above ground; and
    a curved guide having an inner radius and an outer radius, and inner and outer roller tracks respectively provided along the inner radius and the outer radius, said guide absorbing the push and pull forces and guiding the rod assembly along the roller tracks thereby redirecting the push and pull forces from an axis of the drive into an axis of the pipeline,
    wherein the rod segments include at least one concave circular arc section comprising a track having a curved profile defined about an axis oriented generally transverse to a direction of motion of the rod assembly imparted by the drive so as to engage at least one of the inner and outer roller tracks.

4. The system according to claim 3, wherein the pipeline tool comprises an expansion and pull head.

5. The system according to claim 3, wherein the curved profile of the at least one section comprises a radius of curvature that matches one of the inner or outer radii of the guide.

6. The system according to claim 3, wherein the rod assembly comprises couplings having stop ridges that are configured to be inserted into transverse recesses.

7. A rod assembly of a system for operating a pipeline tool, the rod assembly comprising hinge-coupled individual rod segments that are rigid when pushed, wherein the rod assembly is connected to the pipeline tool; wherein the system includes a drive which is arranged above ground and configured to transfer push and pull forces to the rod assembly and a force-absorbing guide configured to redirect the push and pull forces from an axis of the drive into an axis of the pipeline; and wherein the rod assembly comprises a concave circular arc segment shaped section that matches a shape of the guide, the concave circular arc segment comprising a track having a curved profile defined about an axis oriented generally transverse to a direction of motion of the rod assembly imparted by the drive so as to engage at least one of inner and outer roller tracks of the force-absorbing guide.

8. The rod assembly according to claim 7, wherein the circular arc segment shaped section is one of concave/concave and concave/convex.

9. A method for operating a pipeline tool in an underground pipeline, comprising:
 a curved guide in a pit, said curved guide having inner and outer roller tracks respectively provided along an inner radius and an outer radius of the curved guide;
 providing a rod assembly comprised of individual rod sections, said rod assembly received in the curved guide so that one portion of the rod assembly extends substantially vertically in the pit and another portion of the rod assembly extends along a pipeline axis, all said rod sections being hinge-coupled to each other between an end of the one portion and the end of the other portion;
 connecting the pipeline tool to the end of the other portion of the rod assembly;
 applying push and pull forces on the vertically extending portion of the rod assembly; and
 redirecting the push and pull forces into the pipeline axis by absorbing the push and pull forces with the outer and inner roller tracks of the curved guide, respectively,
 wherein at least one of the push and pull forces are redirected by engaging a track formed in each rod segment with at least one of the outer and inner roller tracks, wherein the track comprises a concave circular arc section having a curved profile defined about an axis oriented generally transverse to a direction of motion of the rod assembly imparted by the push and pull forces.

10. A system for operating a pipeline tool, comprising:
 a curved guide arranged in a pit, said curved guide having inner and outer roller tracks respectively provided along an inner radius and an outer radius of the curved guide;
 a rod assembly comprised of individual rod sections, said rod assembly received in the curved guide so that one portion of the rod assembly extends substantially vertically in the pit and another portion of the rod assembly extends along a pipeline axis, all said rod sections being hinge-coupled to each other between an end of the one portion and the end of the other portion, said pipeline tool connected to the end of the other portion of the rod assembly; and
 a drive configured to apply push and pull forces to the vertically extending portion of the rod assembly, said guide redirecting the push forces into the pipeline axis by guiding the rod assembly along the outer roller track and redirecting the pull forces into the pipeline axis by guiding the rod assembly along the inner roller tracks,
 wherein the rod sections include at least one concave circular arc segment comprising a track having a curved profile defined about an axis oriented generally transverse to a direction of motion of the rod assembly imparted by the drive so as to engage at least one of the inner and outer roller tracks.

* * * * *